United States Patent [19]

Ito

[11] Patent Number: 5,127,378

[45] Date of Patent: Jul. 7, 1992

[54] CONTROL DEVICE FOR AN INTERNAL COMBUSTION ENGINE

[75] Inventor: Yasushi Ito, Susono, Japan

[73] Assignee: Toyota Jidosha Kabushiki Kaisha, Toyota, Japan

[21] Appl. No.: 682,689

[22] Filed: Apr. 9, 1991

[30] Foreign Application Priority Data

Apr. 11, 1990 [JP] Japan .................. 2-93927

[51] Int. Cl.⁵ .............. F02D 41/40; F02B 17/00
[52] U.S. Cl. .................. 123/300; 133/305; 133/478
[58] Field of Search .......... 123/276, 299, 300, 305, 123/478, 480, 486

[56] References Cited

U.S. PATENT DOCUMENTS

| | | | |
|---|---|---|---|
| 4,480,620 | 11/1984 | Tange et al. | 123/478 |
| 4,621,599 | 11/1986 | Igashira et al. | 123/305 X |
| 4,785,783 | 11/1988 | Oshiage et al. | 123/480 X |
| 4,955,339 | 9/1990 | Sasaki et al. | 123/305 X |
| 4,958,604 | 9/1990 | Hashimoto | 123/276 |

FOREIGN PATENT DOCUMENTS

| | | |
|---|---|---|
| 60187731 | 2/1986 | Japan . |
| 61-173728 | 10/1986 | Japan . |
| 62-191622 | 8/1987 | Japan . |
| 63-138118 | 6/1988 | Japan . |
| 01073145 | 6/2789 | Japan . |

Primary Examiner—Tony M. Argenbright
Attorney, Agent, or Firm—Kenyon & Kenyon

[57] ABSTRACT

A control device for an internal combustion engine having a cylinder, a spark plug arranged in a cylinder head, and a fuel injector for injecting fuel directly into the cylinder, the fuel injector injecting a part of an amount of fuel to be injected, during an intake stroke, and injecting a remaining part of the amount of fuel to be injected, during a compression stroke, the control device comprising a detecting unit for successively detecting an engine running state, a calculating unit for successively calculating a set of a plurality of engine control values for controlling the engine, the set of a plurality of engine control values being calculated on the basis of one engine running state detected by the detecting unit, and an engine control unit for controlling the engine by using in one combustion cycle the set of a plurality of engine control values calculated by the calculating unit.

17 Claims, 13 Drawing Sheets

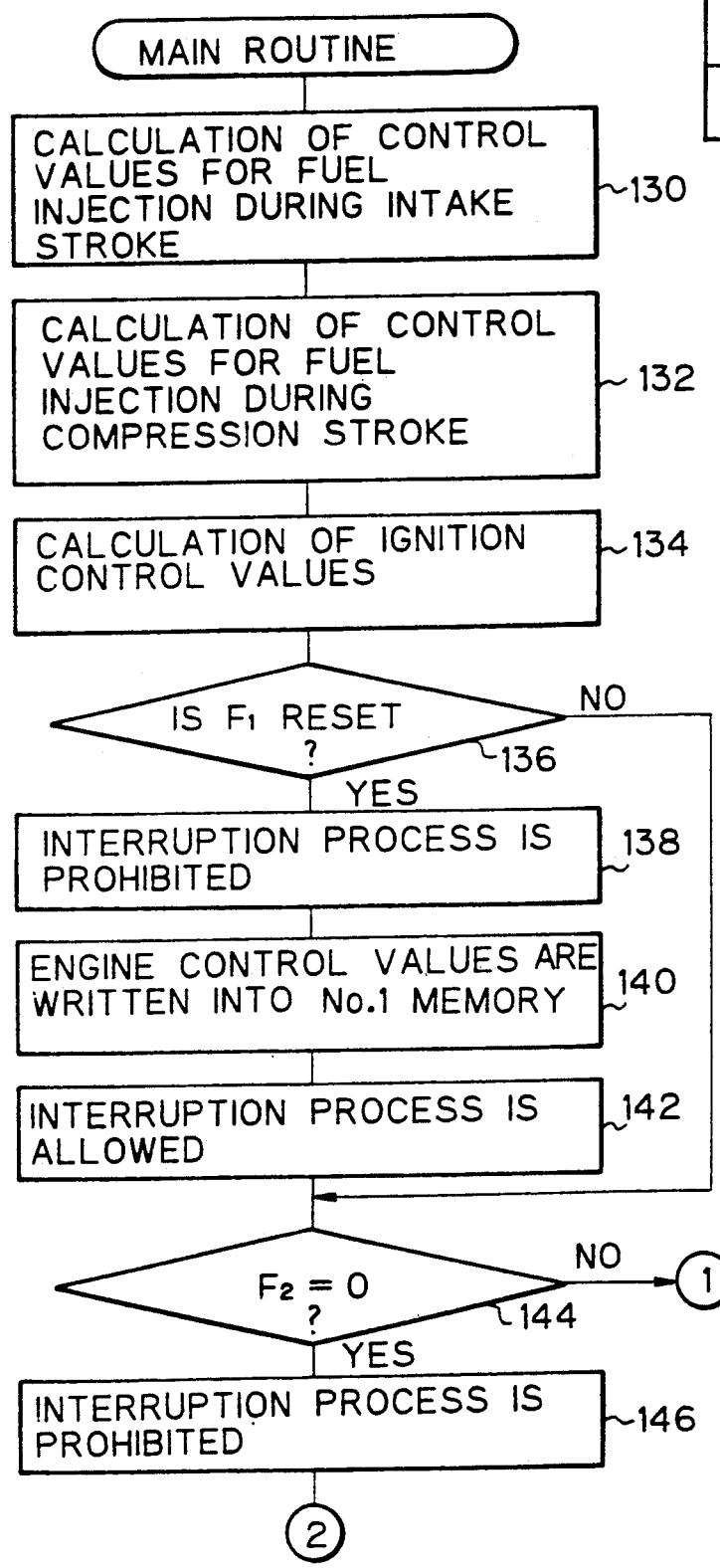

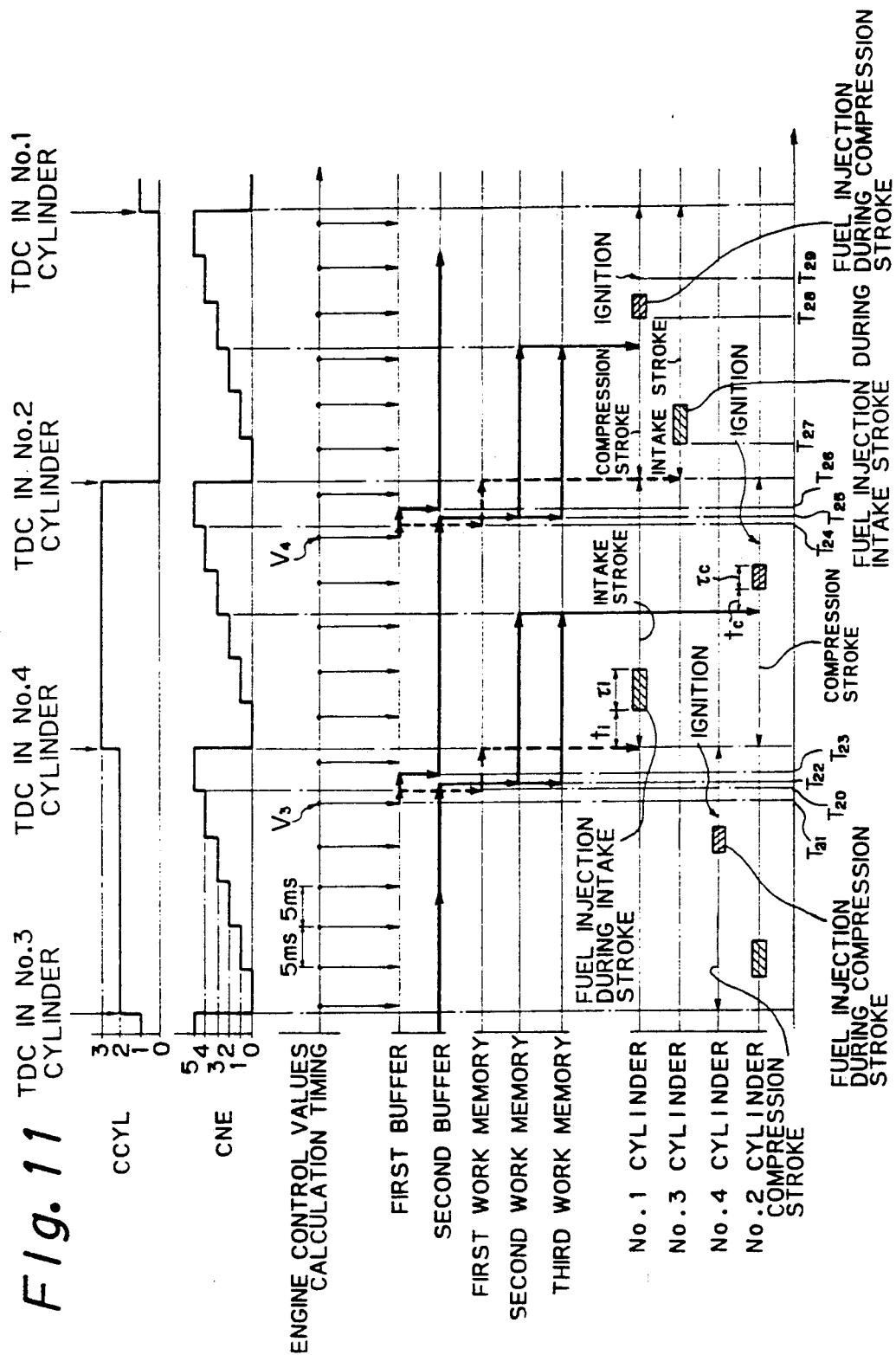

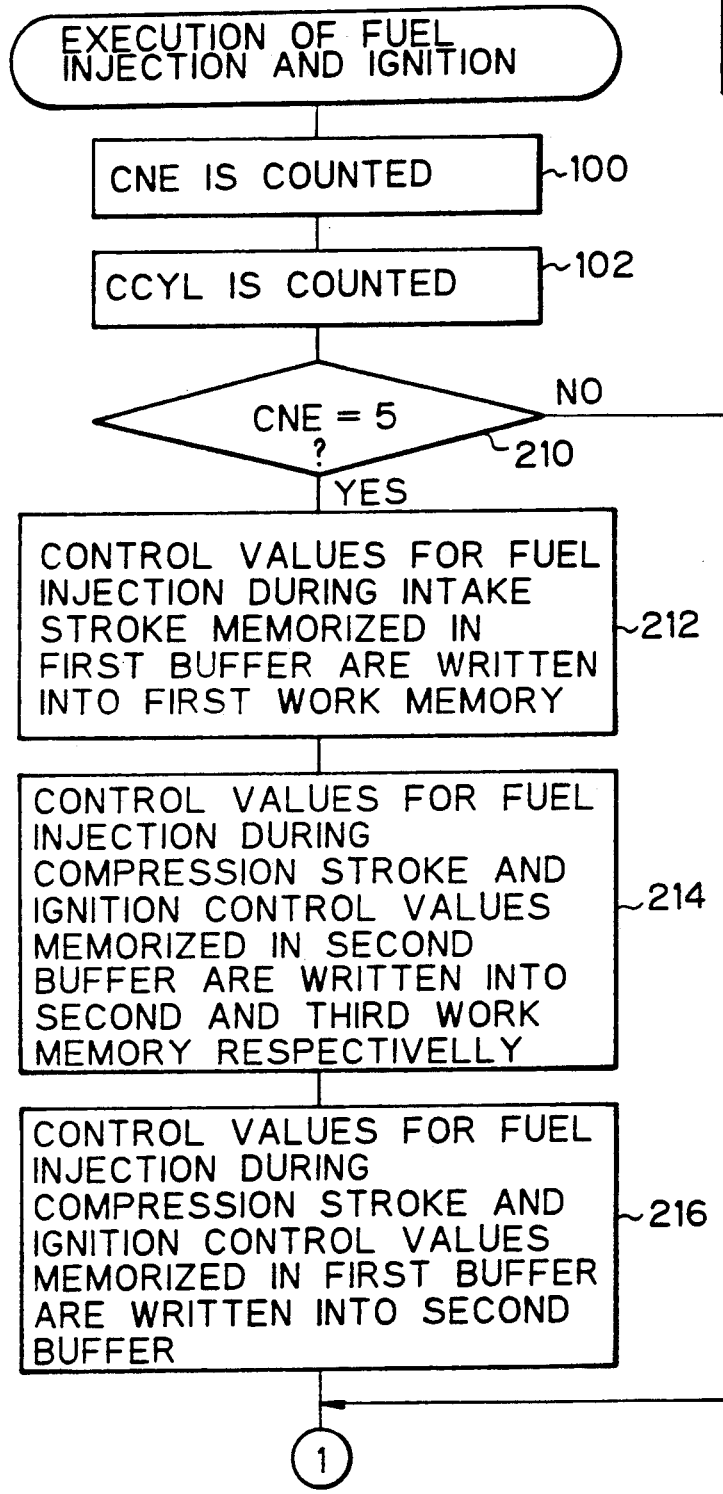

CONTROL DEVICE FOR AN INTERNAL COMBUSTION ENGINE

BACKGROUND OF THE INVENTION

1. Field of the Invention

The present invention relates to a control device for an internal combustion engine.

2. Description of the Related Art

Japanese Unexamined Patent Publication No. 2-169834 discloses an internal combustion engine having a spark plug and a fuel injector for injecting fuel directly into the cylinder, the fuel injector injecting a part of an amount of fuel to be injected, during an intake stroke, and injecting a remaining part of the amount of fuel to be injected, during a compression stroke.

In this engine, however, when a fuel injection during the intake stroke, a fuel injection during the compression stroke, and an ignition are carried out in one combustion cycle on the basis of an engine control value, for example, an amount of fuel to be injected during the intake stroke, an amount of fuel to be injected during the compression stroke, and an ignition timing which are calculated on the basis of different engine running states detected at different points in time, a problems arises in that a good ignition and a good combustion cannot be obtained, as described below.

Referring to FIG. 7, for example, at No. 1 cylinder, when the engine load of the engine running state $V_1$ at $T_{10}$ immediately before the fuel injection during the intake stroke in the No. 1 cylinder is a high engine load, in which an entire amount of fuel to be injected is injected during the intake stroke, a fuel injection during the intake stroke is carried out on the basis of the fuel injection time and the fuel injection timing calculated on the basis of the engine running state $V_1$, and the entire amount of fuel to be injected is injected during the intake stroke in the No. 1 cylinder. Then, at $T_{11}$ immediately before the fuel injection during the compression stroke in the No. 1 cylinder when the engine load of the engine running state $V_2$ is a middle engine load, in which a part of the amount of fuel to be injected is injected during the intake stroke and a remaining part of the amount of fuel to be injected is injected during the compression stroke, a fuel injection during the compression stroke is carried out on the basis of the fuel injection time and the fuel injection timing calculated on the basis of the engine running state $V_2$.

Namely, during one combustion cycle of the engine, the entire amount of fuel calculated on the basis of the engine running state $V_1$ at $T_{10}$ is injected during the intake stroke and a part of the amount of fuel calculated on the basis of the engine running state $V_2$ at $T_{11}$ is injected during the compression stroke. Therefore, since the amount of fuel injected during the one combustion cycle becomes much larger than an ideal amount of fuel to be injected, and thus an air-fuel mixture becomes overrich, a problem arises in that a good ignition and a good combustion cannot be obtained. As a result, a large amount of smoke is produced, a misfire occurs, and the engine torque is fluctuated. Also, since the ignition timing is far different from an ideal ignition timing, the ignition and the combustion is further deteriorated.

SUMMARY OF THE INVENTION

An object of the present invention is to provide a control device for an internal combustion engine by which the above problems are solved.

According to the present invention, there is provided a control device for an internal combustion engine having a cylinder, a spark plug arranged in a cylinder head, and a fuel injector for injecting fuel directly into the cylinder, the fuel injector injecting a part of an amount of fuel to be injected, during an intake stroke, and injecting a remaining part of the amount of fuel to be injected, during a compression stroke, the control device comprising: detecting means for successively detecting an engine running state; a calculating means for successively calculating a set of a plurality of engine control values for controlling the engine, the set of a plurality of engine control values being calculated on the basis of one engine running state detected by the detecting means; and an engine control means for controlling the engine by in one combustion cycle using the set of a plurality of engine control values calculated by the calculating means.

The present invention may be more fully understood from the description of preferred embodiment of the invention set forth below, together with the accompanying drawings.

BRIEF DESCRIPTION OF THE DRAWINGS

In the drawings:

FIGS. 8, 8A and 8B are a flow chart for executing the fuel injection and an ignition according to the first embodiment;

FIGS. 9, 9A and 9B are a main routine according to the first embodiment;

FIG. 11 is a time chart illustrating an operation of the second embodiment; and

FIGS. 12, 12A and 12B are a flow chart for executing the fuel injection and the ignition according to the second embodiment.

DESCRIPTION OF THE PREFERRED EMBODIMENTS

Figure 1:
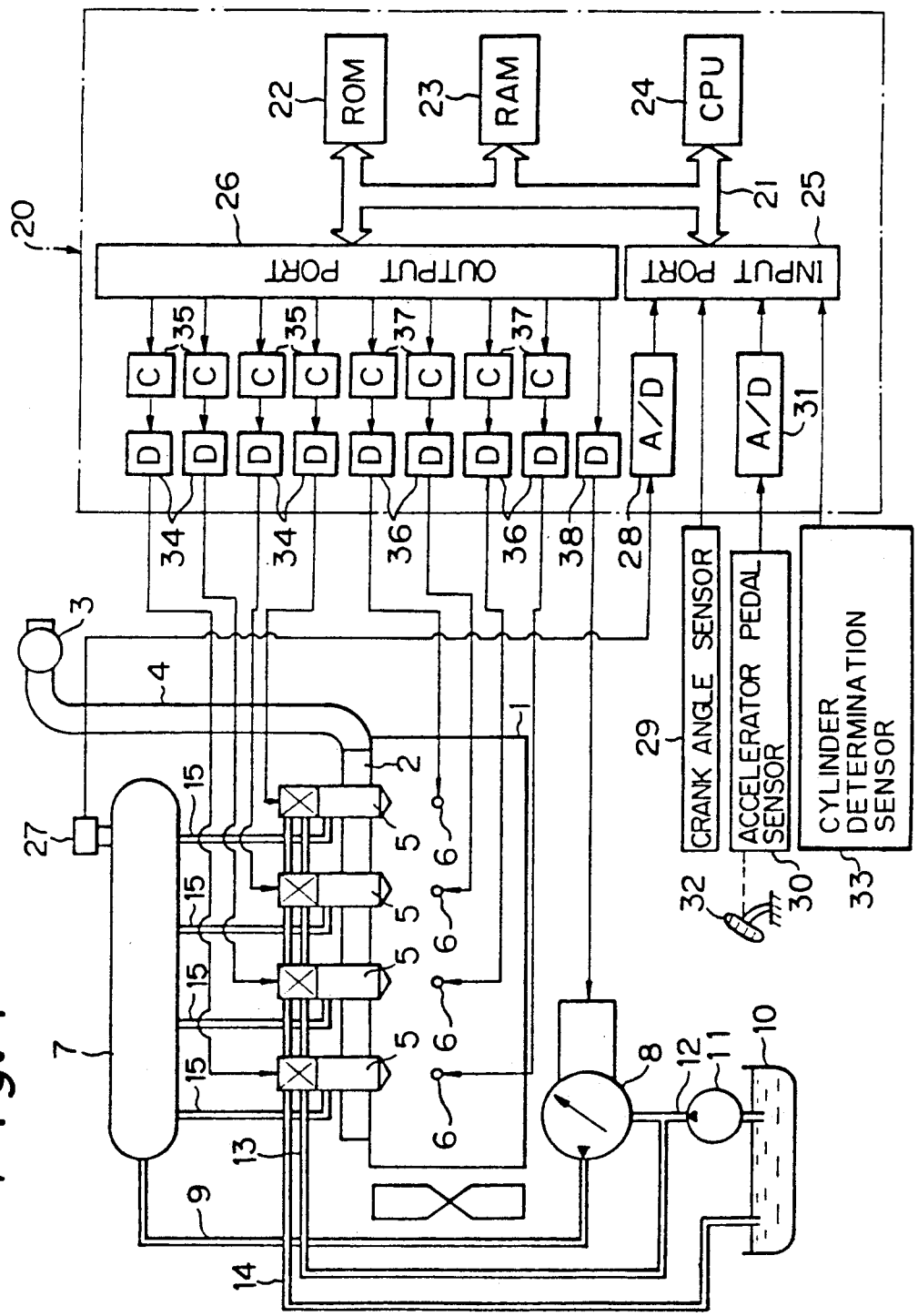
FIG. 1 is a schematic view of a four-cylinder gasoline engine.

Referring to FIG. 1, reference numeral 1 designates an engine body, 2 a surge tank, 3 an air cleaner, 4 an intake pipe, 5 fuel injectors, 6 spark plugs, and 7 a reservoir tank. The intake pipe 4 connects the surge tank 2 to the air cleaner 3, and a low pressure fuel pump 11 supplies fuel from a fuel tank 10 to a high pressure fuel pump 8 via a conduit 12. The high pressure fuel pump 8 supplies a high pressure fuel to the reservoir tank 7 via a high pressure conduit 9. The conduit 12 is connected to a cooling pipe 13 for cooling the piezoelectric elements of each fuel injector 5, and the cooling pipe 13 is connected to the fuel tank 10 via a return pipe 14. Each fuel supply pipe 15 connects each fuel injector 5 to the reservoir tank 7.

The electronic control unit 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected via a bidirectional bus 21. A pressure sensor 27 for detecting a pressure in the reservoir tank 7 is connected to the input port 25 via an AD converter 28. A crank angle sensor 29 generates a pulse at predetermined crank angles, and the pulses output by the crank angle sensor 29 are input to the input port 25, and accordingly, an engine speed is calculated on the basis of the pulses output by the crank angle sensor 29. An accelerator pedal sensor 30 for detecting a degree of opening $\theta A$ of an accelerator pedal 32 is connected to the input port 25 via an AD converter 31. A cylinder determination sensor 33 for outputting pulses at top dead center during a compression stroke of No. 1 cylinder and No. 4 cylinder is connected to the input port 25.

Each fuel injector 5 is connected to the output port 26 via each drive circuit 34 and each counter 35, each spark plug 6 is connected to the output port 26 via each drive circuit 36 and each counter 37, and the high pressure fuel pump 8 is connected to the output port 26 via a drive circuit 38.

Figure 2:
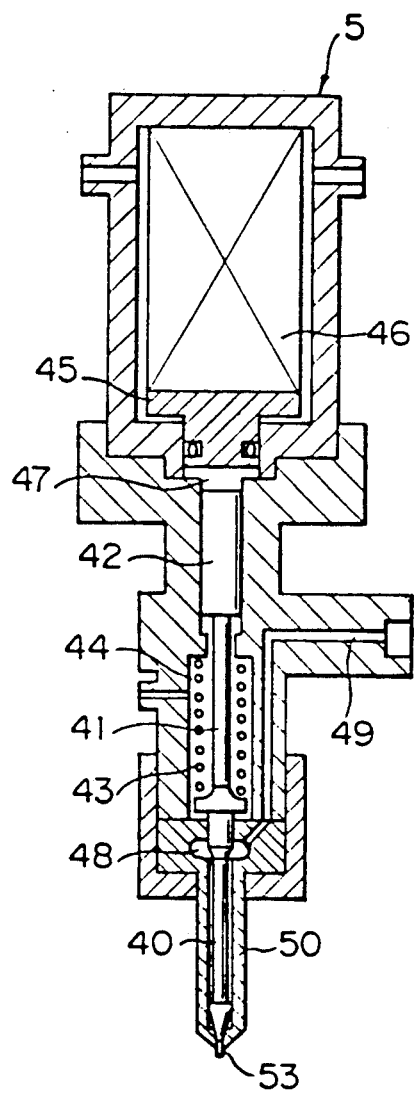
FIG. 2 is a cross-sectional side view of a fuel injector.

FIG. 2 illustrates the fuel injector 5. Referring to FIG. 2, reference numeral 40 designates a needle inserted into a nozzle 50, 41 a rod, 42 a movable plunger, 45 a pressure piston, 46 a piezoelectric element, and 48 a needle pressure chamber. A compression spring 43 is arranged in a spring space 44 and urges the needle 40 downward. A pressure chamber 47 is defined by the top of the movable plunger 42 and the bottom of the pressure piston 45, and is filled with fuel. The needle pressure chamber 48 is connected to the reservoir tank 7 (FIG. 1) via a fuel passage 49 and the fuel supply pipe 15 (FIG. 1), and accordingly, high pressure fuel in the reservoir tank 7 is supplied to the fuel chamber 48 via the fuel supply pipe 15 and the fuel passage 49. When a charge is given to the piezoelectric element 46 to stop the fuel injection, the piezoelectric element 46 expands axially, and as a result, the pressure piston 45 is moved downward in FIG. 2, and thus the fuel pressure in the pressure chamber 47 is rapidly increased. When the fuel pressure in the pressure chamber 47 is increased, the movable plunger 42 is moved downward in FIG. 2, and therefore, the needle is also moved downward and closes a nozzle opening 53.

On the other hand, when the charge of the piezoelectric element 46 is discharged to start the fuel injection, the piezoelectric element 46 is contracted, and as a result, the pressure piston 45 is moved upward in FIG. 2, and thus the fuel pressure in the pressure chamber 47 is reduced. When the fuel pressure in the pressure chamber 47 is reduced, the movable plunger 42 is moved upward in FIG. 2, and therefore, the needle is also moved upward and opens the nozzle opening 53.

Figure 3:
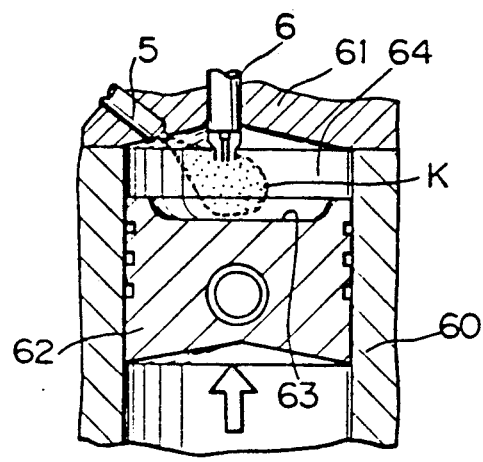
FIG. 3 is a cross-sectional side view of an engine to which a embodiment of the present invention is applied.

FIG. 3 illustrates an engine to which a embodiment of the present invention is applied. Referring to FIG. 3, reference numeral 60 designates a cylinder block, 61 a cylinder head, and 62 a piston. A cylindrical cavity 63 is formed at the center of the top of the piston 62, and a cylinder chamber 64 is defined between the top of the piston 62 and the bottom of the cylinder head 61. The spark plug 6 is arranged at approximately the center of the cylinder head 61. Although not shown in the drawing, an intake port and an exhaust port are formed in the cylinder head 61, and an intake valve 66 (see FIG. 6(a)) and an exhaust valve are arranged respectively at each opening of the intake port and the exhaust port to the cylinder chamber 64. The fuel injector 5 is a swirl type injector, and therefore, an atomized fuel injected from the fuel injector 5 has a wide spread angle and the speed of the injected fuel, which is along the direction of the injection, is relatively slow. The fuel injector 5 is arranged at the top of the cylinder chamber 64, inclined downwardly, so as to inject fuel to the vicinity of the spark plug 6. Furthermore, the direction of the fuel injection and the fuel injection timing of the fuel injector 5 are determined such that the fuel injected from the fuel injector 5 is directed to the cavity 63 formed at the top of the piston 62. An arrow shows direction of movement of the piston 62.

Figure 4:
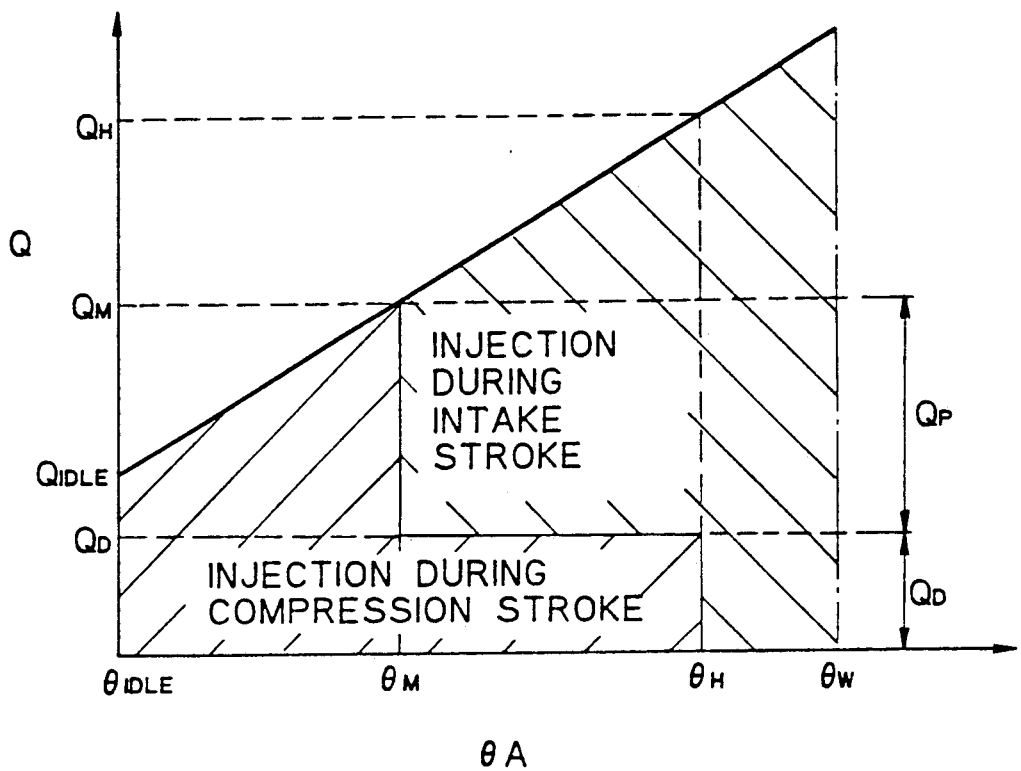
FIG. 4 is a diagram illustrating a control pattern of a fuel injection of the embodiment.

FIG. 4 illustrates a control pattern of a fuel injection according to the embodiment of the present invention. Referring to FIG. 4, the horizontal axis represents a degree of opening $\theta A$ of the accelerator pedal 32 (i.e, an engine load) and the vertical axis represents an amount Q of fuel to be injected. The amount Q of fuel to be injected is calculated on the basis of an engine speed $N_e$ and the degree of opening $\theta A$ of the accelerator pedal 32. When the degree of opening $\theta A$ of the accelerator pedal 32 is equal to or larger than a degree of opening $\theta_{IDLE}$ for idling and is smaller than a degree of opening $\theta_M$ for an medium engine load, all of the calculated amount of fuel is injected during a compression stroke. At this time, the amount of fuel to be injected during the compression stroke is increased from an amount $Q_{IDLE}$ of fuel for idling to an amount $Q_M$ of fuel for the medium engine load, in accordance with the increase of the degree of opening $\theta A$. When the degree of opening $\theta A$ is equal to $\theta_M$, the amount $Q_C$ of fuel to be injected during the compression stroke is rapidly reduced from $Q_M$ to $Q_D$ and an amount of fuel to be injected during an intake stroke is rapidly increased from 0 to $Q_P$. $Q_M$, as calculated from the following equation, is an amount of fuel corresponding to a medium load.

$$Q_M = Q_D + Q_P$$

Where, $Q_D$ represents a first minimum amount of fuel to be injected during the compression stroke for forming an air-fuel mixture which can be ignited by the spark plug 6, and $Q_P$ represents a second minimum amount of fuel to be injected during the intake stroke for forming an air-fuel mixture in which a flame can be propagated even when the injected fuel is uniformly diffused in the cylinder chamber 64. The first minimum amount $Q_D$ of fuel for an ignition is considerably smaller than an amount $Q_{IDLE}$ of fuel for idling. When the degree of opening $\theta A$ is larger than the degree of opening $\theta_M$ for the medium engine load and smaller than a degree of opening $\theta_H$ for a high engine load, a part of the calculated amount of fuel is injected during the intake stroke and a remaining part of the calculated amount of fuel is injected during the compression stroke. At this time, the amount of fuel to be injected during the compression stroke is constant at $Q_D$ and the amount of fuel to be injected during the intake stroke is increased in accordance with the increase of the degree of opening $\theta A$.

When the degree of opening $\theta A$ is larger than the degree of opening $\theta_H$ and is smaller than or equal to the degree of opening $\theta_W$ for a full opening, all of the calculated amount of fuel is injected during the intake stroke because an air-fuel premixture formed by the fuel injected during the intake stroke is rich enough to be ignited. Where, $Q_H$ corresponding to the degree of opening $\theta_H$ represents a minimum amount of fuel to be injected during the intake stroke for forming an air-fuel mixture which can be ignited by the spark plug 65, even when the injected fuel is uniformly diffused in the cylinder chamber 64.

Where, the intake stroke means a stroke from top dead center in an exhaust process to bottom dead center in an intake process, and the compression process means a stroke from bottom dead center in the intake process to top dead center in a compression process.

Figure 5:
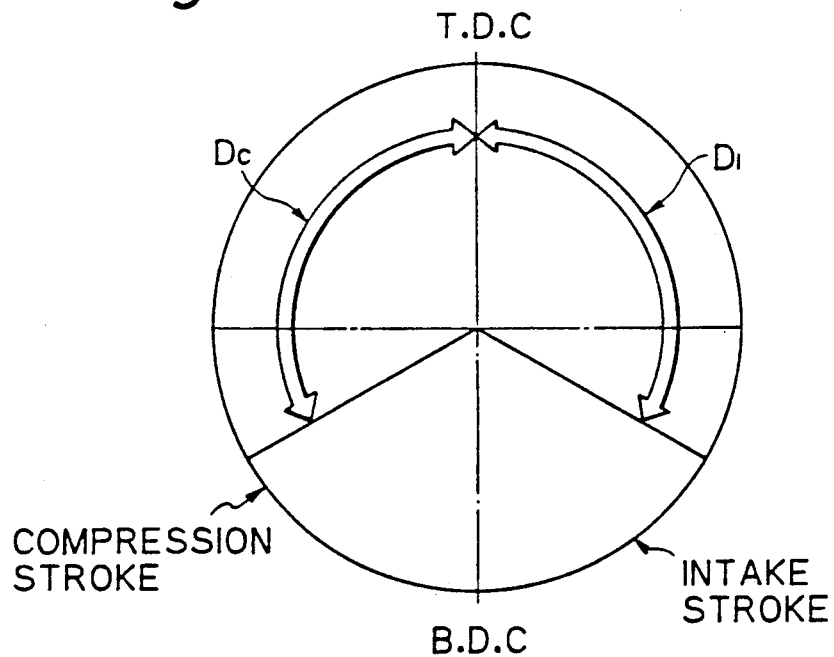
FIG. 5 is a diagram illustrating a fuel injection timing.

FIG. 5 illustrates a fuel injection period. Referring to FIG. 5, a fuel injection during the intake stroke is carried out within a period shown by $D_I$. This period $D_I$ corresponds to approximately a first half of the intake stroke. A fuel injection during the compression stroke is carried out within a period shown by $D_C$. The term $D_C$ corresponds to approximately a latter half of the compression stroke. The term $D_I$ and the term $D_C$ are symmetric with respect to the line connecting T.D.C and B.D.C in FIG. 5. As fuel is injected within the term $D_I$ or $D_C$, injected fuel does not directly impinge the inner face of the cylinder block 60, and therefore, little injected fuel adheres to the inner surface of the cylinder block 60.

When the degree of opening $\theta A$ is smaller than $\theta_M$, i.e., the engine load is low, fuel is injected from the fuel injector 5 during approximately the latter half of the compression stroke (FIG. 5) and directed toward the spark plug 6 and the cavity 63 at the top of the piston 62 shown in FIG. 3. Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the spark plug 6. As the distribution of fuel in the area K is not uniform and an air-fuel mixture formed in the area K has an air-fuel ratio of from rich to lean, an air-fuel mixture which has a stoichiometric air-fuel ratio and burns easily exists in the area K. Therefore an air-fuel mixture in the vicinity of the spark plug 6 can be ignited easily and the ignited flame propagated over the whole of the air-fuel mixture to complete the combustion. In this manner, when the engine is operating under a low load, fuel is injected to the vicinity of the spark plug 6 during approximately the latter half of the compression stroke, and therefore, an inflammable air-fuel mixture is formed near the spark plug 6 and thus a good ignition and a good combustion is obtained.

Figure 6:
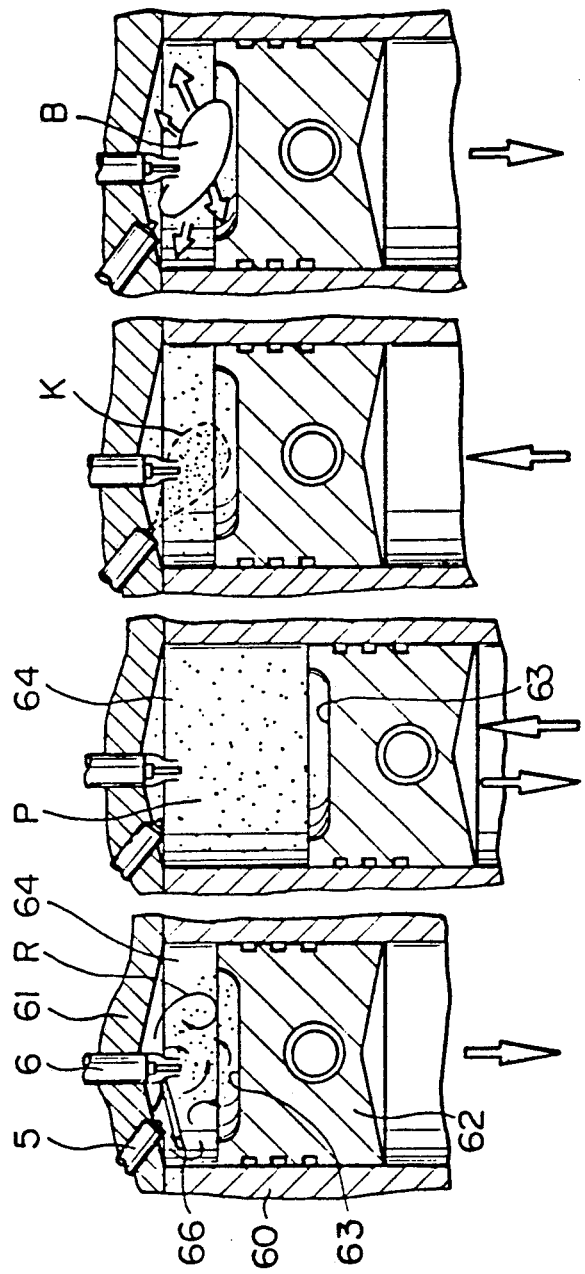
FIG. 6($a$–$d$) are a diagram illustrating an operation of a fuel injection during an intake stroke and a fuel injection during an compression stroke.

When the degree of opening $\theta A$ is equal to or larger than $\theta_M$ and smaller than $\theta_H$, a part of the calculated amount of fuel is injected from the fuel injector 5 to the spark plug 6 and the cavity 63 during approximately the first half of the intake stroke (FIG. 6(a)). The speed of the injected fuel along with the injection director is relatively slow and the injected fuel is atomized, and therefore, a part of the injected fuel floats in the cylinder chamber 64 and a remaining part of injected fuel impinges on the cavity 63. The injected fuel is diffused in the cylinder chamber 64 by the turbulent flow R caused by intake air flowing from the intake port and an air-fuel premixture P is formed in the cylinder chamber 64 (FIG. 6(b)). The air-fuel ratio of the air-fuel premixture P is such that a flame can be propagated. Fuel is injected during approximately the first half of the intake process (FIG. 5), and therefore, the injected fuel can be fully evaporated and fully diffused in the cylinder chamber to be completely mixed with the air therein.

Also, since fuel is not injected at approximately BDC the fuel injected from the fuel injector 5 does not directly impinge on the inner surface of the cylinder block 60, and thus little injected fuel is adhered to the inner surface of the cylinder block 60.

A remaining part of the calculated amount of fuel is injected from the fuel injector 5 to the spark plug 6 and the cavity 63 during approximately the latter half of the compression stroke. Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the spark plug 6 (FIG. 6(c)). As the distribution of the fuel in the area K is not uniform and an air-fuel mixture formed in the area K has an air-fuel ratio of from rich to lean, an air-fuel mixture which has a stoichiometric air-fuel ratio and burns easily exists in the area K. Therefore when an inflammable air-fuel mixture near the spark plug 6 is ignited, combustion of the air-fuel mixture in the area K is progressive (FIG. 6(d)), the combustion gas B expands, and a flame is propagated to burn the air-fuel premixture P.

As mentioned above, when the engine is operating under a medium load, a part of a calculate amount of fuel is injected during approximately the first half of the intake stroke to form the air-fuel premixture in the cylinder chamber 64, and a remaining part of the calculated amount of fuel is injected during approximately the latter half of the compression stroke to form the air-fuel mixture in the vicinity of the spark plug 6 for ignition. Accordingly, a good ignition and a good combustion, which fully utilizes the air therein, are obtained.

Especially when all of the calculated amount of fuel is injected during the intake stroke or at an early stage of the compression stroke when the engine is operating under a medium load, as the injected fuel is diffused in the cylinder chamber 64, the air-fuel mixture formed in the cylinder chamber 64 becomes over lean, and thus a problem arises in that ignition and combustion of the air-fuel mixture becomes difficult. On the contrary, when all of the calculated amount of fuel is injected at a late stage of the compression stroke when the engine is operating under a medium load, a problem arises in that much smoke is produced and the full engine power is not obtained because the utilization ratio of the air is low.

Also, under a medium load, the air-fuel ratio of the air-fuel premixture, which is formed by the fuel injected during approximately the first half of the intake stroke, can be learner than the maximum air-fuel ratio of the air-fuel mixture which can be ignited, and can have an air-fuel ratio of the air-fuel mixture by which flame is propagated, and therefore, the fuel consumption can be reduced due to a lean burn.

Figure 7:
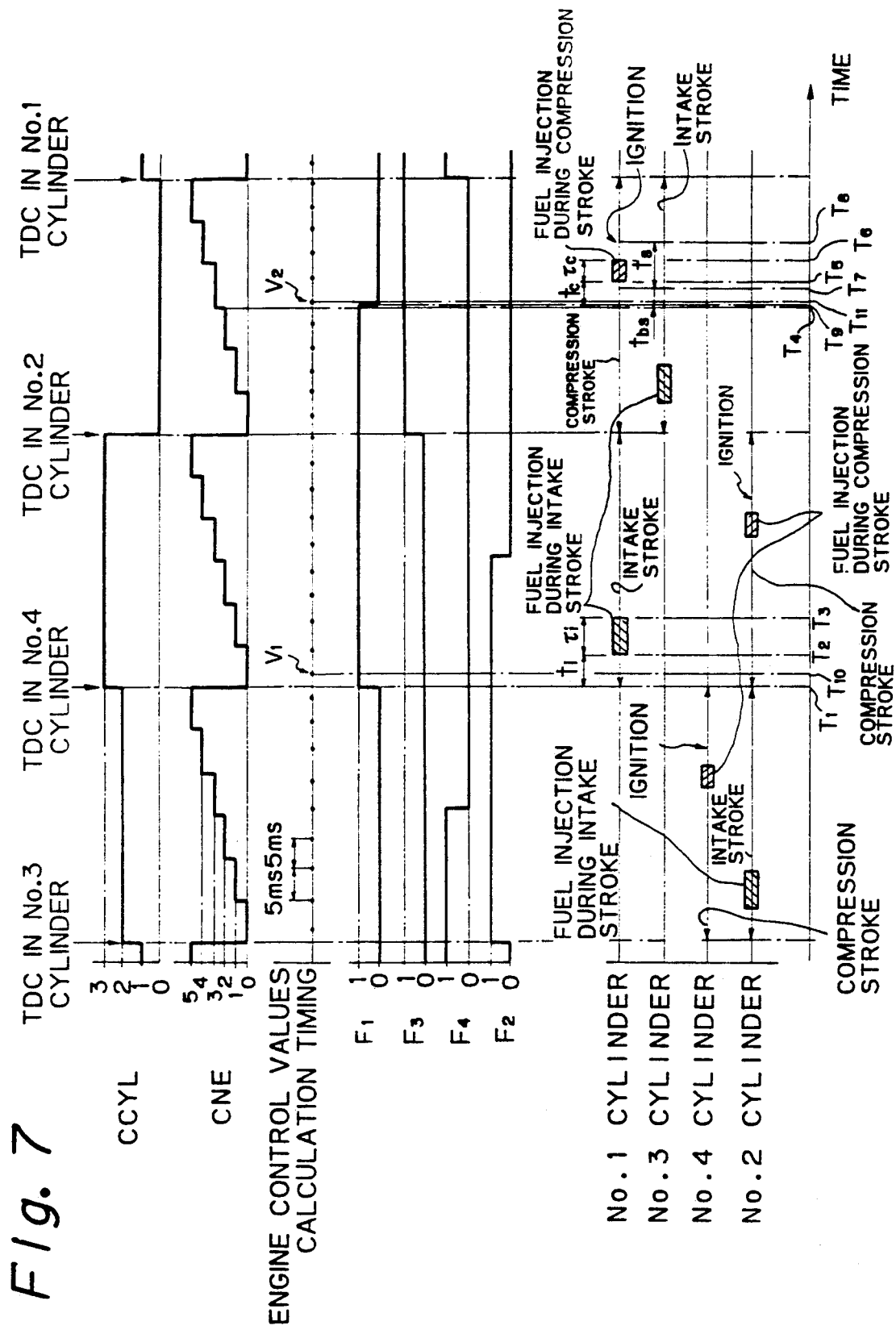
FIG. 7 is a time chart illustrating an operation of a first embodiment.

Referring to FIG. 7, a set of a plurality of an engine control values, for example, a fuel injection time during an intake stroke, a fuel injection time during a compression stroke, and an ignition timing are successively calculated on the basis of an engine running state, for example, the engine speed and the degree of opening of the accelerator pedal, at each calculation timing shown by a black dot in FIG. 7. A set of a plurality of the engine control values are successively calculated every 5 ms.

By the way, when a fuel injection during the intake stroke, a fuel injection during the compression stroke, and an ignition are carried out in one combustion cycle on the basis of an engine control values, for example, an amount of fuel to be injected during the intake stroke, an amount of fuel to be injected during the compression stroke, and an ignition timing which are calculated on the basis of different engine running states detected at different points in time, a problems arises in that a good ignition and a good combustion can not be obtained, as described below.

For example, concerning a No. 1 cylinder, when the engine load of the engine running state $V_1$ at $T_{10}$ immediately before the fuel injection during the intake stroke in the No. 1 cylinder is a high engine load of which an entire amount of fuel to be injected is injected during the intake stroke, a fuel injection during the intake stroke is carried out on the basis of the fuel injection time and the fuel injection timing calculated on the basis of the engine running state $V_1$, and the entire amount of fuel to be injected is injected during the intake stroke in the No. 1 cylinder. Then, at $T_{11}$ immediately before the fuel injection during the compression stroke in the No. 1 cylinder, when the engine load of the engine running state $V_2$ is a middle engine load of which a part of the amount of fuel to be injected is injected during the intake stroke and a remaining part of the amount of fuel to be injected is injected during the compression stroke/a fuel injection during the compression stroke is carried out on the basis of the fuel injection time and the fuel injection timing calculated on the basis of the engine running state $V_2$.

Namely, during one combustion cycle of the engine, the entire amount of fuel calculated on the basis of the engine running state $V_1$ at $T_{10}$ is injected during the intake stroke and a part of the amount of fuel calculated on the basis of the engine running state $V_2$ at $T_{11}$ is injected during the compression stroke. Therefore, since the amount of fuel injected during the one combustion cycle becomes much larger than an ideal amount of fuel to be injected and thus an air-fuel mixture becomes much rich, a problem arises in that a good ignition and a good combustion can not be obtained. As a result, much smoke is produced, a misfire occurs, and an engine torque largely fluctuates. Also, since the ignition timing is far different from an ideal ignition timing the ignition and the combustion is further deteriorated.

Therefore, in this invention, since control values for the fuel injection during the intake stroke, control values for the fuel injection during the compression stroke, and the ignition control values, which are calculated on the basis of the same engine running state detected at the same time, are used in the one combustion cycle, the amount of fuel to be injected during the intake stroke, the amount of fuel to be injected during the compression stroke, and the ignition control values are adjusted in the one combustion stroke, and thus a good combustion can be obtained.

Figure 8A:
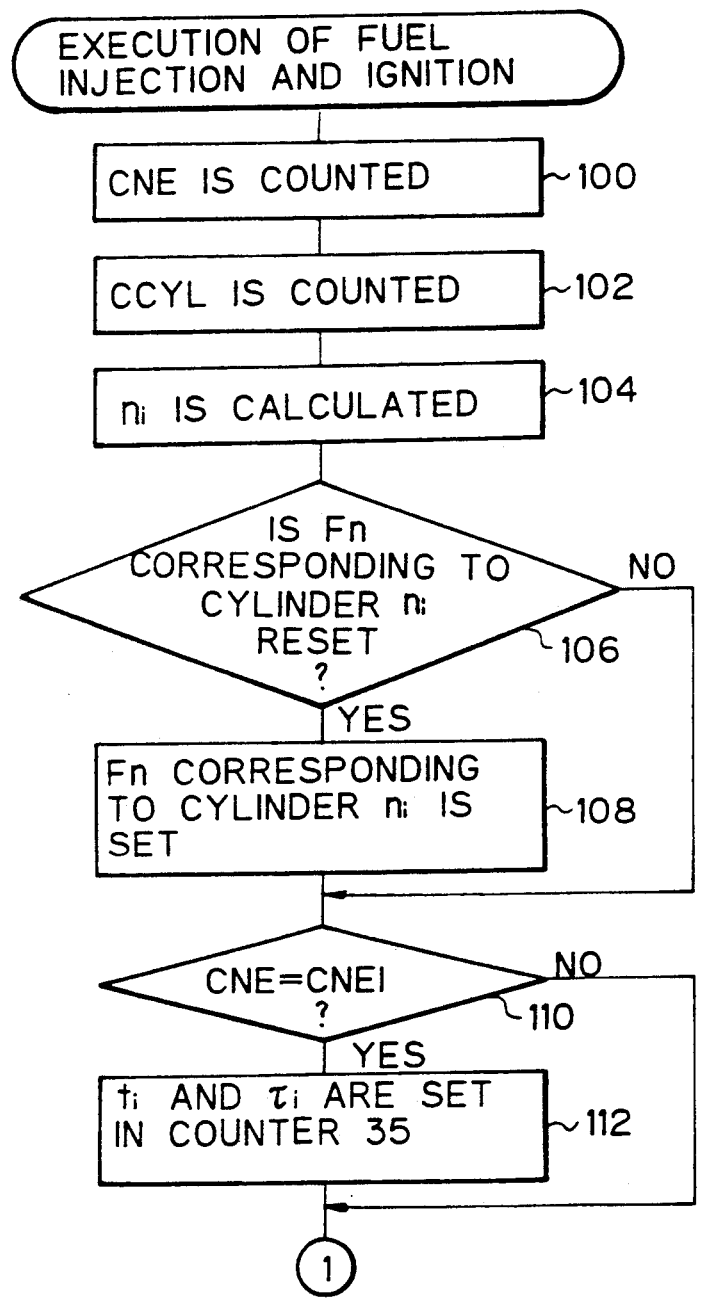
Figure 8B:
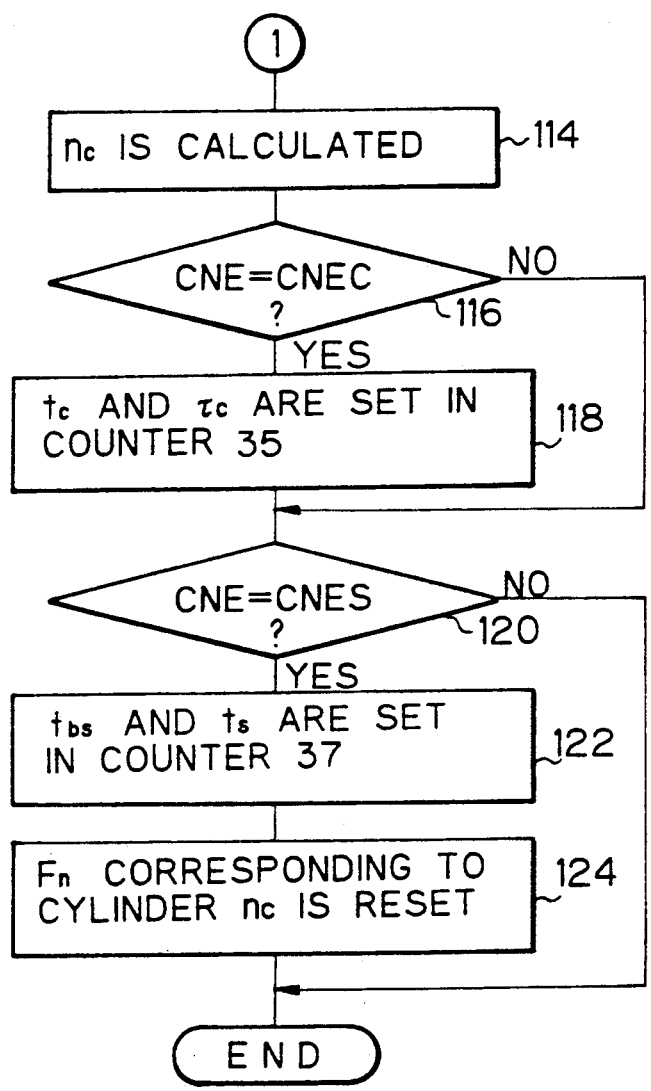

FIG. 8 illustrates a routine for executing the fuel injection and the ignition according to a first embodiment of the present invention. The routine illustrated in FIG. 8 is processed by sequential interruptions executed at every crank angle of 30°.

Referring to FIG. 8, at step 100, a crank angle counter CNE is counted. CNE is incremented by 1 at every crank angle of 30°, from 0 to 5, after CNE becomes 5, CNE is made 0 and again CNE is incremented by 1 at every crank angle of 30° (see FIG. 7). At step 102, a cylinder determination counter CCYL is counted. CCYL is incremented by 1 at every crank angle of 180°, from 0 to 3, after CCYL becomes 3, CCYL is made 0 and again CCYL is incremented by 1 at every crank angle of 180° (see FIG. 7).

As shown in FIG. 7, a time at which CCYL is changed represents a top dead center (TDC) during the compression stroke, for example, the time at which CCYL is changed from 2 to 3 represents TDC during the compression stroke in No. 4 cylinder, the time at which CCYL is changed from 3 to 0 represents TDC during the compression stroke in No. 2 cylinder, and the time at which CCYL is changed from 0 to 1 represents TDC during the compression stroke in No. 1 cylinder. The time at which CNE is changed from 5 to 0 is the same time at which CCYL is changed, and represents TDC during the compression stroke.

Returning to FIG. 8, at step 104, the cylinder $n_i$ in which the fuel injection during the intake stroke should be carried out is calculated on the basis of CNE and CCYL. In the cylinder $n_i$, the intake stroke is being carried out and a piston is positioned between TDC during the intake stroke and BDC (bottom dead center) during the intake stroke. Then, at step 106, it is determined whether or not a writing prohibition flag $F_n$ corresponding to the cylinder $n_i$ is reset. For example, when the fuel injection during the intake stroke in the No. 1 cylinder should be carried out, it is determined whether or not the writing prohibition flag $F_1$ corresponding to the No. 1 cylinder is reset. When $F_n$ corresponding to the cylinder $n_i$ is reset, the routine goes to step 108 and $F_n$ corresponding to the cylinder $n_i$ is set. Conversely, when $F_n$ corresponding to the cylinder $n_i$ is set, step 108 is skipped. Accordingly, $F_n$ corresponding to the cylinder $n_i$ is set immediately after the intake stroke in the cylinder $n_i$ is started, i.e., immediately after the TDC during the intake stroke in the cylinder $n_i$ (see FIG. 7). When $F_n$ corresponding to the cylinder $n_i$ is set, the writing of engine control values into a No. $n_i$ memory (control value memory) corresponding to the cylinder $n_i$ is prohibited.

Then at step 110, it is determined whether or not CNE becomes equal to a count value CNEI of which an injection start time $t_i$ and an fuel injection time $\tau_i$ during the intake stroke should be set in the counter 35 (see FIG. 1). When CNE becomes equal to CNEI, the routine goes to step 112, and $t_i$ and $\tau_i$ which are memorized in a No. $n_i$ memory (control value memory) corresponding to cylinder $n_i$ are set in the counter 35 (see FIG. 1). When $t_i$ is set in the counter 35, the counter 35 starts to count, and when $t_i$ was elapsed, the fuel injection during the intake stroke is carried out. At this time, the fuel injection time is counted, and when $\tau_i$ has elapsed, the fuel injection during the intake stroke is stopped.

For example, referring to FIG. 7, concerning No. 1 cylinder, when CNEI calculated on the basis of the engine speed and the engine load (degree of opening of the accelerator pedal) is equal to 0, $t_i$ and $\tau_i$ are set in the counter 35 at $T_1$. The fuel injection during the intake stroke is started at $T_2$ at which $t_i$ has elapsed from $T_i$, and is finished at $T_3$ at which $\tau_i$ has elapsed from $T_2$. Note, when $\tau_i$ is equal to 0 the fuel injection during the intake stroke is not carried out.

Returning to FIG. 8, at step 110, when CNE is not equal to CNEI, step 112 is skipped. Then, at step 114, the cylinder $n_c$ in which the fuel injection during the compression stroke and the ignition should be carried out is calculated on the basis of CNE and CCYL. In the cylinder $n_c$, the compression stroke is being carried out and the piston is positioned between BDC during the intake stroke and TDC during the compression stroke. At step 116, it is determined whether or not CNE becomes equal to a count value CNEC of which an injection start time $t_c$ and the fuel injection time $\tau_c$ during the compression stroke should be set in the counter 35 (see FIG. 1). When CNE becomes equal to CNEC, the routine goes to step 118, and $t_c$ and $\tau_c$ which are memorized in a No. $n_c$ memory corresponding to cylinder $n_c$ are set in the counter 35. When $t_c$ is set in the counter 35, the counter 35 starts to count, and when $t_c$ has elapsed, the fuel injection during the compression stroke is carried out. At this time, the fuel injection time is counted, and when $\tau_c$ has elapsed, the fuel injection during the compression stroke is stopped.

For example, referring to FIG. 7, concerning No. 1 cylinder, when calculated CNEC is equal to 3, $t_c$ and $\tau_c$ are set in the counter 35 at $T_4$. The fuel injection during the compression stroke is started at $T_5$ at which $t_c$ is elapsed from $T_4$, and is finished at $T_6$ at which $\tau_c$ is elapsed from $T_5$. Note, when $\tau_c$ is equal to 0, the fuel injection during the intake stroke is not carried out.

Returning to FIG. 8, at step 116, when CNE is not equal to CNEC, step 118 is skipped. At step 120, it is determined whether or not CNE becomes equal to a count value CNES, the ignition control values of which should be set in the counter 37 (see FIG. 1). When CNE becomes equal to CNES, the routine goes to step 122, and an ON start time $t_{bs}$ and an ON time which are memorized in a No. $n_c$ memory corresponding to cylinder $n_c$ are set in the counter 37 (see FIG. 1). When $t_{bs}$ is set in the counter 37, the counter 37 starts to count, and when $t_{bs}$ has elapsed, a primary coil of an igniter is energized. At this time, the ON time is counted, and when $t_s$ has elapsed, the ignition is carried out.

For example, referring to FIG. 7, at No. 1 cylinder, when the calculated CNES is equal to 3, $t_{bs}$ and $t_s$ are set in the counter 37, and the primary coil of the igniter is energized at $T_7$, at which $t_{bs}$ has elapsed from $T_4$, and the ignition is carried out at $T_8$ at which $t_s$ has elapsed from $T_7$.

Returning to FIG. 8, at step 124, $F_n$ corresponding to the cylinder $n_c$ is reset. Namely, in FIG. 7, $F_1$ corresponding to No. 1 cylinder is reset immediately after $t_{bs}$ and $t_s$ are set in the counter 37, i.e., at $T_9$ immediately after $T_4$. When $F_1$ corresponding to No. 1 cylinder is reset, the engine control values can be written into a No. 1 memory corresponding to No. 1 cylinder.

Conversely, in step 120, if CNE is not equal to CNES, step 122 and step 124 are skipped.

Figure 9B:
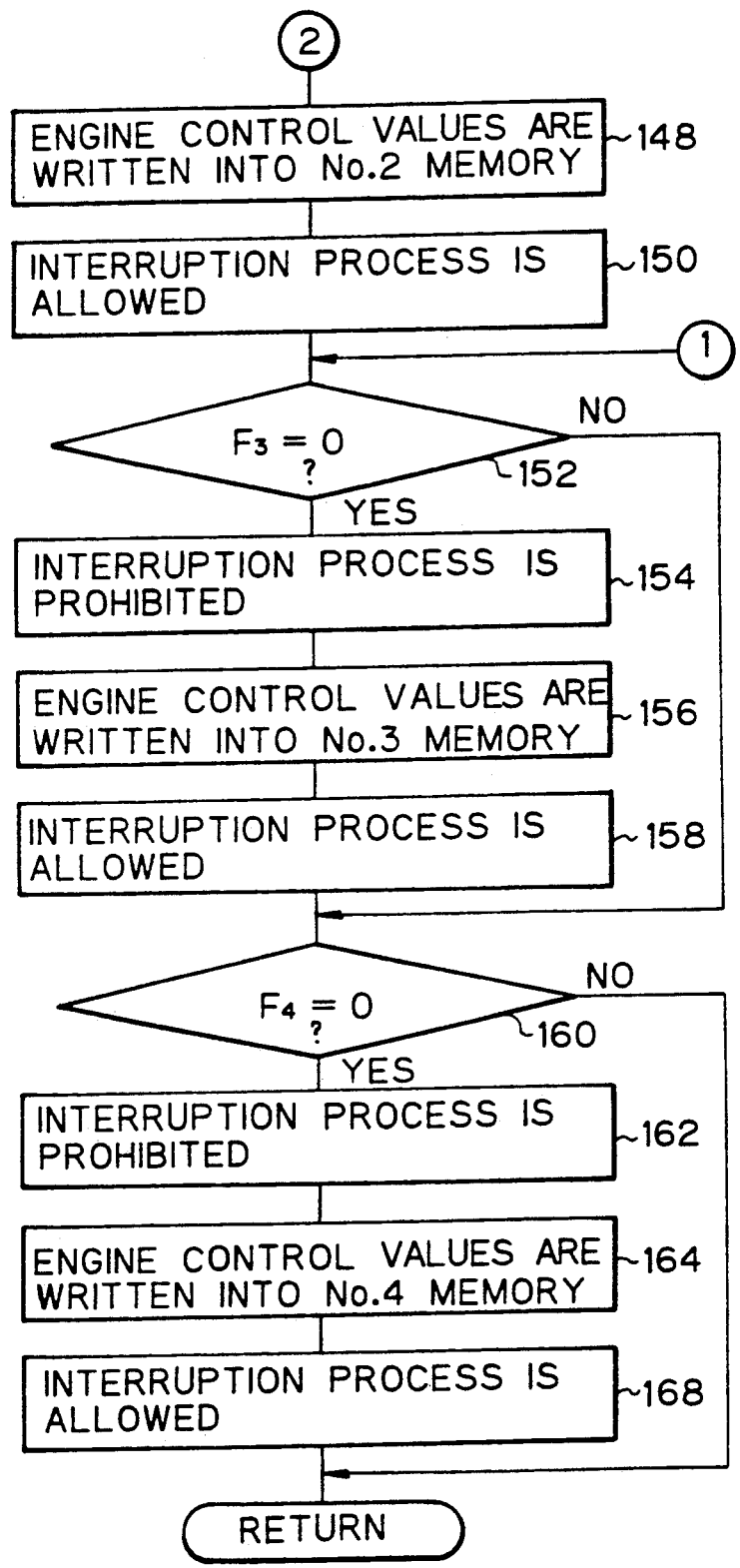

FIG. 9 illustrates a main routine according to a first embodiment of the present invention. This main routine is executed at 5 ms intervals.

Referring to FIG. 9, at step 130, control values for the fuel injection during the intake stroke are calculated on the basis of the engine speed and the degree of opening of the accelerator pedal. Where, the control values for the fuel injection during the intake stroke represent the injection start time $t_i$, the fuel injection time $\tau_i$ during the intake stroke, and the count value CNEI, the $t_i$ and $\tau_i$ of which should be set in the counter 35. Then, at step 132, control values for the fuel injection during the compression stroke are calculated on the basis of the engine speed and the degree of opening of the accelerator pedal. Where, the control values for the fuel injection during the compression stroke represent the injection start time $t_c$, the fuel injection time $\tau_c$ during the compression stroke, and the count value CNEC, the $t_c$ and $\tau_c$ of which should be set in the counter 35. At step 134, ignition control values are calculated on the basis of the engine speed and the degree of opening of the accelerator pedal. Where the ignition control values represent the ON start time $t_{bs}$, the ON time $t_s$, and the count value CNES, the $t_{bs}$ and $t_s$ of which should be set in the counter 37. These engine control values, i.e., the control values for the fuel injection during the intake stroke, the control values for the fuel injection during the compression stroke, and the ignition control values are calculated on the basis of the same engine running state detected at the same time, at each calculation timing shown by a black dot in FIG. 7, i.e., at every 5 ms.

At step 136, it is determined whether or not the writing prohibition flag $F_1$ corresponding to the No. 1 cylinder is reset. If $F_1$ is reset, the routine goes to step 138, and the interruption process of the routine shown in FIG. 8 is prohibited. At step 140, the engine control values calculated at steps 130, 132, and 134 in the present processing cycle are written to the No. 1 memory corresponding to the No. 1 cylinder. The No. 1 memory is a part of the memory area of RAM 23 (see FIG. 1). At step 142, the interruption process of the routine shown in FIG. 8 is allowed.

If $F_1$ is set at step 136, steps 138, 140, and 142 are skipped. Accordingly the engine control values calculated in the present processing cycle are not written to the No. 1 memory, and thus the engine control values which are memorized in the No. 1 memory are maintained as they are. Namely, when $F_1$ is set, i.e., when the engine control values memorized in the No. 1 memory is used to control the engine, the engine control values which are memorized in the No. 1 memory are maintained as they are. Accordingly, since the control values for the fuel injection during the intake stroke, the control values for the fuel injection during the compression stroke, and the ignition control values, which are calculated on the basis of the same engine running state detected at the same time, are used in the one combustion cycle, the amount of fuel to be injected during the intake stroke, the amount of fuel to be injected during the compression stroke, and the ignition control values are adjusted in the one combustion stroke. Therefore, since the sum of the amount of fuel to be injected during the intake stroke and the amount of fuel to be injected during the compression stroke are made equal to the ideal amount of fuel to be injected, the air-fuel ratio can be controlled to be a target air-fuel ratio. Also, the ignition timing can be controlled to be an ideal ignition timing, and as a result, since a good ignition and a good combustion are obtained, the production of a large amount of smoke, the occurrence of misfires, and large fluctuations of an engine torque can be prevented.

At step 144, it is determined whether or not the writing prohibition flag $F_2$ corresponding to the No. 2 cylinder is reset. If $F_2$ is reset, the routine goes to step 146 and the interruption process of the routine shown in FIG. 8 is prohibited. At step 148, the engine control values calculated at steps 130, 132, and 134 in the present processing cycle are written to the No. 2 memory corresponding to the No. 2 cylinder. At step 168, the interruption process of the routine shown in FIG. 8 is allowed.

At step 152 through step 158, and step 160 through step 168, the process similar to the process from step 136 to step 142 is executed.

As described above, in accordance with the first embodiment of the present invention, since the amount of fuel to be injected during the intake stroke, the amount of fuel to be injected during the compression stroke, and the ignition control values are adjusted in the one combustion stroke, a good ignition and a good combustion can be obtained.

Note, although the first embodiment is described with regard to a four-cylinder engine, this embodiment can be applied to, for example, a six-cylinder engine, by comprising six control value memories or to an eight-cylinder engine by comprising eight control value memories.

A second embodiment of the present invention is now described with reference to FIGS. 10 through 12, and is applied to an engine similar to that illustrated in FIG. 1.

Figure 10:
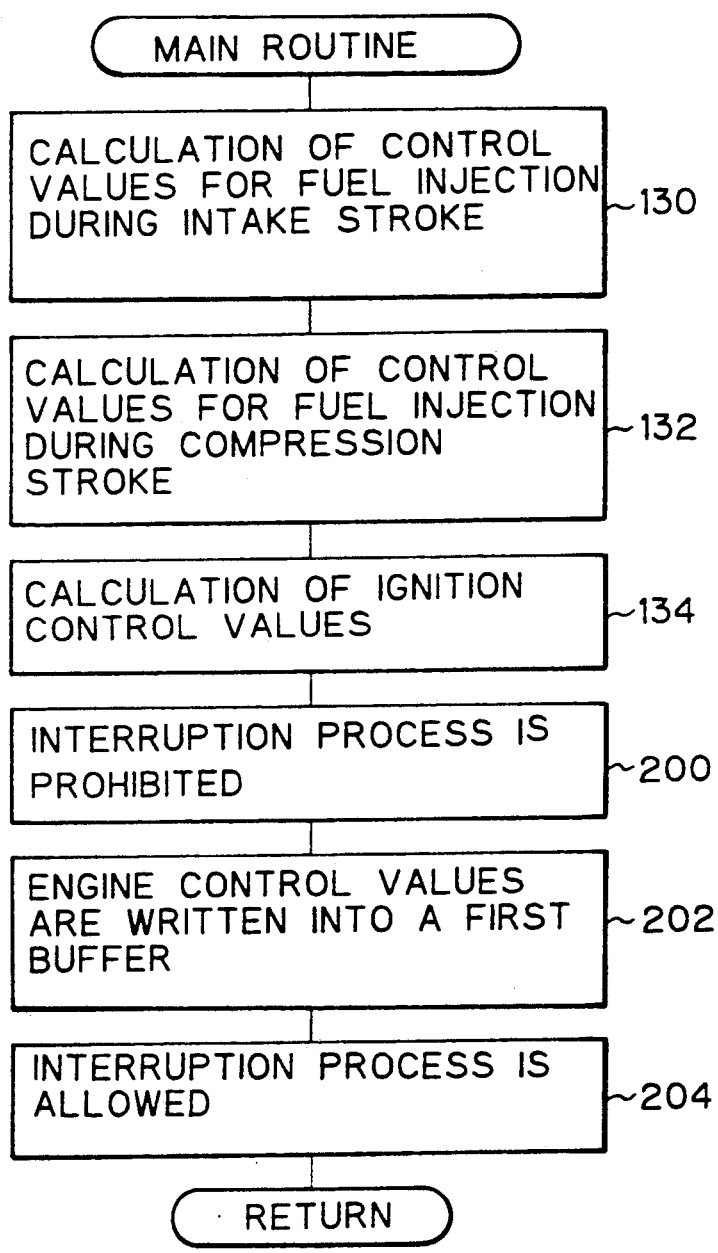
FIG. 10 is a main routine according to a second embodiment.

FIG. 10 illustrates a main routine in accordance with a second embodiment of the present invention. This main routine is executed at 5 ms intervals. In FIG. 10, similar steps are indicated by the same step numbers used in FIG. 9.

Referring to FIG. 10, at step 130 the control values for the fuel injection during the intake stroke are calculated, at step 132 the control values for the fuel injection during the compression stroke are calculated, and at step 134 the ignition control values are calculated. These engine control values are calculated on the basis of the same engine running state detected at the same time, at each calculation timing shown by a black dot in FIG. 11, i.e., at every 5 ms.

Figure 12B:
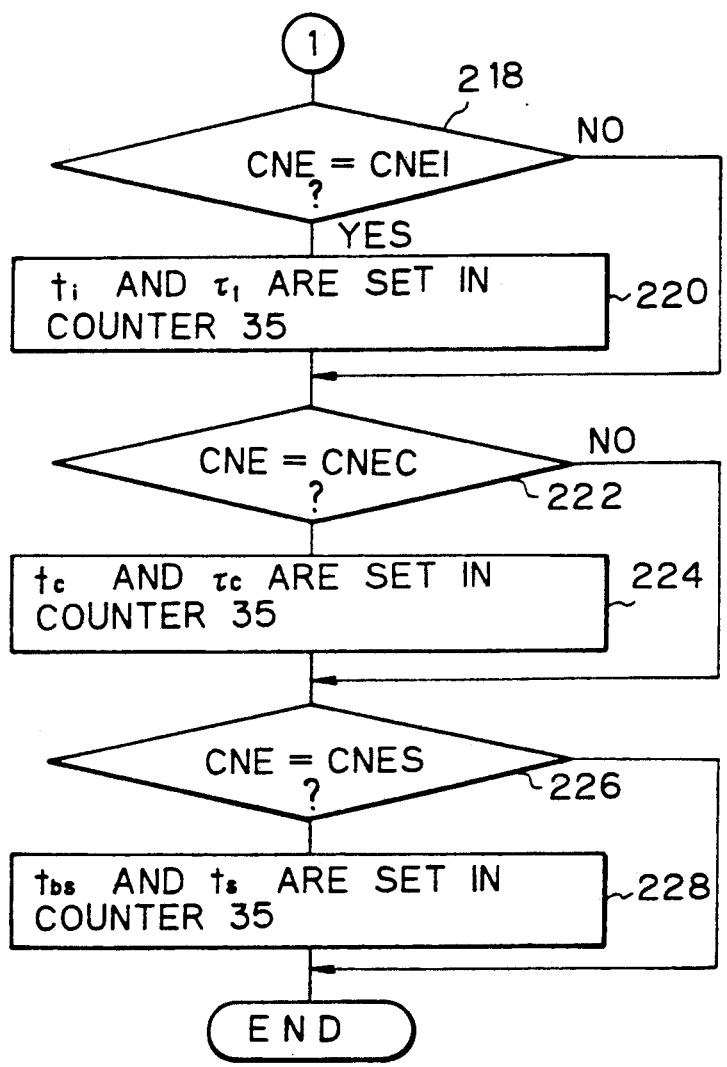

At step 200, the interruption process of the routine shown in FIG. 12 is prohibited. At step 202 the engine control values calculated at step 130, step 132, and step 134 in the present processing cycle are written into a first buffer. Accordingly, the set of a plurality of engine control values calculated on the basis of the same engine running state detected at the same time are successively written in the first buffer as shown in FIG. 11. The first buffer is a part area of the memory area of RAM 23 (see FIG. 1). Then at step 204, the interruption process executed by a routine shown in FIG. 11 is allowed.

FIG. 12 illustrates a routine for executing the fuel injection and the ignition in accordance with a second embodiment of the present invention. The routine illustrated in FIG. 12 is processed by sequential interruptions executed at every crank angle of 30°. In FIG. 12, similar steps are indicated by the same step numbers used in FIG. 8.

Referring to FIG. 12, at step 100, CNE is counted, and at step 102 CCYL is counted. At step 210, it is determined whether or not CNE is equal to 5. When CNE is equal to 5, the routine goes to step 212 and the control values for the fuel injection during the intake stroke memorized in the first buffer are written to a first work memory for the fuel injection during the intake stroke. This first work memory is a part of the memory area of RAM 23.

Referring to FIG. 11, the control values for the fuel injection during the intake stroke memorized in the first buffer are written to the first work memory at $T_{20}$ at which CNE becomes equal to 5. At this time, the engine control values memorized in the first buffer are the engine control values calculated on the basis of the engine running state $V_3$ at $T_{21}$ immediately before $T_{20}$.

At step 214, the control values for the fuel injection during the compression stroke and the ignition control values, which have been written to a second buffer in the processing cycle in which CNE became equal to 5 at the last time, are written to a second work memory for the fuel injection during the compression stroke and a third work memory for the ignition respectively.

Referring to FIG. 11, for example, at $T_{22}$, the control values for the fuel injection during the compression stroke and the ignition control values corresponding to No. 2 cylinder, which are memorized in the second buffer, are written to the second and third work memory respectively.

Returning to FIG. 12, at step 216, the control values for the fuel injection during the compression stroke and the ignition control values memorized in the first buffer are written to the second buffer.

Referring to FIG. 11, the control values for the fuel injection during the compression stroke and the ignition control values written to the first buffer at $T_{21}$ are written to the second buffer at $T_{23}$.

Note, to clarify the above, although the period between $T_{20}$ and $T_{23}$ appears relatively long in FIG. 11, since $T_{20}$ and $T_{23}$ correspond to step 212 and step 216 in FIG. 12 respectively, the period between $T_{20}$ and $T_{23}$ is very short.

Returning to FIG. 12, at step 210, when CNE is not equal to 5, steps 212, 214, and 216 are skipped, and thus the engine control values memorized in each work memory and the second buffer are retained as they are. At step 218, it is determined whether or not CNE becomes equal to a count value CNEI, an injection start time $t_i$ and an fuel injection time $\tau_i$ during the intake stroke of which should be set in the counter 35 (see FIG. 1). When CNE becomes equal to CNEI, the routine goes to step 220, $t_i$ and $\tau_i$ are set in the counter 35, and then the fuel injection during the intake stroke is carried out. For example, as shown in FIG. 11, the fuel injection during the intake stroke in No. 1 cylinder is carried out on the basis of the control values for the fuel injection during the intake stroke corresponding to No. 1 cylinder, which were written into the first work memory at $T_{20}$.

At step 222, it is determined whether or not CNE becomes equal to a count value CNEC, an injection start time $t_c$ and the fuel injection time $\tau_c$ during the compression stroke of which should be set in the counter 35 (see FIG. 1). When CNE becomes equal to CNEC, the routine goes to step 224, $t_c$ and $\tau_c$ are set in the counter 35, and then the fuel injection during the compression stroke is carried out. For example, as shown in FIG. 11, the fuel injection during the compression stroke in No. 2 cylinder is carried out on the basis of the control values for the fuel injection during the compression stroke corresponding to No. 2 cylinder, which were written to the second work memory at $T_{22}$.

At step 226, it is determined whether or not CNE becomes equal to a count value CNES, the ignition control values of which should be set in the counter 37 (see FIG. 1). When CNE becomes equal to CNES, the routine goes to step 228, an ON start time $t_{bs}$ and an ON time are set in the counter 37 (see FIG. 1), and then the ignition is carried out. For example, as shown in FIG. 11, the ignition in No. 2 cylinder is carried out on the basis of the ignition control values corresponding to No.

2 cylinder, which are written to the third work memory at $T_{22}$.

After the above process, the routine is completed.

Referring to FIG. 11, when CNE becomes equal to 5 again at $T_{24}$, as mentioned above, the control values for the fuel injection during the intake stroke calculated on the basis of the engine running state V4 and memorized in the first buffer is written to the first work memory. The engine control values calculated on the basis of the engine running state $V_4$ are used for the fuel injection during the intake stroke, the fuel injection during the compression stroke, and the ignition in No. 3 cylinder. Then, the control values for the fuel injection during the compression stroke and the ignition control values corresponding to No. 1 cylinder, which were written to the second buffer at $T_{23}$, are written to the second work memory and the third work memory respectively at $T_{25}$. Then, at $T_{26}$, the control values for the fuel injection during the compression stroke and the ignition control values corresponding to No. 3 cylinder are written to the second buffer. At $T_{27}$, the fuel injection during the intake stroke in the No. 3 cylinder is carried out on the basis of the control values for the fuel injection during the intake stroke corresponding to No. 3 cylinder, which are memorized in the first work memory. At $T_{28}$, the fuel injection during the compression stroke in the No. 1 cylinder is carried out on the basis of the control values for the fuel injection during the compression stroke corresponding to No. 1 cylinder, which are memorized in the second work memory. At $T_{29}$, the ignition is carried out in No. 1 cylinder on the basis of the ignition control values corresponding to No. 1 cylinder, which are memorized in the third work memory.

As described above, the second embodiment obtains an effect similar to that obtained in the first embodiment. Namely, in the second embodiment, since control values for the fuel injection during the intake stroke, control values for the fuel injection during the compression stroke, and the ignition control values, which are calculated on the basis of the same engine running state detected at the same time, are used in the one combustion cycle, the amount of fuel to be injected during the intake stroke, the amount of fuel to be injected during the compression stroke, and the ignition control values are adjusted in the one combustion stroke, and thus a good ignition and a good combustion can be obtained.

Furthermore the program for executing the second embodiment is simpler than the program for executing the first embodiment.

Note, concerning step 212, step 214, and step 216 in FIG. 12, it is essential that step 214 be executed before step 216. Accordingly, step 212 may be executed immediately after step 214 or may be executed after step 216.

Although the invention has been described with reference to specific embodiments chosen for purposes of illustration, it should be apparent that numerous modifications can be made thereto without departing from the basic concept and scope of the invention.

We claim:

1. A control device for an internal combustion engine having a cylinder, a spark plug arranged in a cylinder head, and a fuel injector for injecting fuel directly into the cylinder, said fuel injector injecting a part of an amount of fuel to be injected during an intake stroke, and injecting a remaining part of said amount of fuel to be injected during a compression stroke, said control device comprising:

detecting means for successively detecting an engine running state calculating means for successively calculating a set of a plurality of engine control values for controlling the engine, said set of a plurality of engine control values being calculated on the basis of one engine running state detected by said detecting means and including an amount of fuel to be injected during the intake stroke, a fuel injection timing during the intake stroke, an amount of fuel to be injected during the compression stroke, a fuel injection timing during the compression stroke, and an ignition timing;

engine control means for controlling the engine by in one combustion cycle using said set of a plurality of engine control values calculated by said calculating means, said engine control means controlling the fuel injector and the spark plug on the basis of said set of a plurality of engine control values calculated by said calculating means; and first memory means, second memory means, third memory mans, and fourth memory means, said set of a plurality of engine control values calculated by said calculating means being successively written to said first memory means, the amount of fuel to be injected during the intake stroke and the fuel injection timing during the intake stroke of one set of a plurality of engine control values memorized in said first memory means being written to said second memory means, the amount of fuel to be injected during the compression stroke, the fuel injection timing during the compression stroke, and the ignition timing of said one set of a plurality of engine control values memorized in said first memory means being written to said third memory means, the amount of fuel to be injected during the compression stroke, the fuel injection timing during the compression stroke, and the ignition timing, which were memorized in said third memory means last time, being written to said fourth memory means before said amount of fuel to be injected during the compression stroke, said fuel injection timing during the compression stroke, and said ignition timing of said one set of a plurality of engine control values memorized in said first memory means are written to said third memory means at this time, said engine control means controlling the fuel injector on the basis of said amount of fuel to be injected during the intake stroke and fuel injection timing during the intake stroke memorized in said second memory means, and said amount of fuel to be injected during the compression stroke and fuel injection timing during the compression stroke memorized in said fourth memory means, and controlling the spark plug on the basis of said ignition timing memorized in said fourth memory means.

2. A control device according to claim 1, wherein said detecting means comprises an engine speed detecting unit for detecting an engine speed and an engine load detecting unit for detecting an engine load.

3. A control device according to claim 1, wherein said detecting means comprises an engine load detecting unit for detecting an engine load, and said amount of fuel to be injected during the intake stroke, which is calculated by said calculating means, is equal to 0 when said engine load detected by said engine load detecting unit is smaller than a first predetermined engine load.

4. A control device according to claim 3, wherein said first predetermined engine load represents a middle engine load.

5. A control device according to claim 4, wherein an amount of fuel to be injected corresponding to said first predetermined engine load is equal to an amount of fuel which is a sum of a first minimum amount of fuel to be injected during the compression stroke for forming an air-fuel mixtures which can be ignited by the spark plug and a second minimum amount of fuel to be injected during the intake stroke for forming an air-fuel mixture in which a flame can be propagated even when the injected fuel is uniformly diffused in the cylinder.

6. A control device according to claim 1, wherein said detecting means comprises an engine load detecting unit for detecting an engine load, and said amount of fuel to be injected during the compression stroke, which is calculated by said calculating means, is equal to 0 when said engine load detected by said engine load detecting unit is larger than a second predetermined engine load.

7. A control device according to claim 6, wherein said second predetermined engine load represents a high engine load.

8. A control device according to claim 7, wherein an amount of fuel to be injected corresponding to said second predetermined engine load is equal to a third minimum amount of fuel to be injected during the intake stroke for forming an air-fuel mixture which can be ignited by the spark plug even when the injected fuel is uniformly diffused in the cylinder.

9. A control device for an internal combustion engine having a cylinder head and at least one cylinder, each cylinder having a spark plug arranged in the cylinder head and a fuel injector for injecting fuel directly into the cylinder, said fuel injector injecting a part of an amount of fuel to be injected during an intake stroke, and injecting a remaining part of said amount of fuel to be injected during a compression stroke, said control device comprising:

detecting means for successively detecting an engine running state;

calculating means for successively calculating a set of a plurality of engine control values for controlling the engine, said set of a plurality of engine control values being calculated on the basis of one engine running state detected by said detecting means;

memory means corresponding to each cylinder, said set of a plurality of engine control values calculated by said calculating means being successively written to each memory means; and engine control means for controlling the engine in one combustion cycle by using said set of a plurality of engine control values calculated by said calculating means, wherein said engine control means controls each fuel injector and spark plug on the basis of said set of a plurality of engine control values memorized in the corresponding memory means, and from a time at which said engine control means begins to use one set of a plurality of engine control values to a time at which said engine control means completes the use of said one set of a plurality of engine control values, said engine control means prohibits writing of said set of a plurality of engine control values to the memory means corresponding to a cylinder in which said engine control means controls the fuel injector and the spark plug.

10. A control device according to claim 9, wherein said detecting means comprises an engine speed detecting unit for detecting an engine speed and an engine load detecting unit for detecting an engine load.

11. A control device for an internal combustion engine having a cylinder head and at least one cylinder, each cylinder having a spark plug arranged in the cylinder head and a fuel injector for injecting fuel directly into the cylinder, said fuel injector injecting a part of an amount of fuel to be injected during an intake stroke, and injecting a remaining part of said amount of fuel to be injected during a compression stroke, said control device comprising:

detecting means for successively detecting an engine running state;

calculating means for successively calculating a set of a plurality of engine control values for controlling the engine, said set of a plurality of engine control values being calculated on the basis of one engine running state detected by said detecting means and wherein said plurality of engine control values include an amount of fuel to be injected during the intake stroke, a fuel injection timing during the intake stroke, an amount of fuel to be injected during the compression stroke, a fuel injection timing during the compression stroke, and an ignition timing;

engine control means for controlling the engine in one combustion cycle by using said set of a plurality of engine control values calculated by said calculating means, said engine control means controlling the fuel injector and the spark plug of each cylinder on the basis of said set of a plurality of engine control values calculated by said calculating means; and memory means corresponding to each cylinder, said set of a plurality of engine control values calculated by said calculating means being successively written to each memory means, wherein said engine control means controls the fuel injector and the spark plug on the basis of said set of a plurality of engine control values memorized in each memory means, and from a time at which said engine control means begins to use one set of a plurality of engine control values to a time at which said engine control means completes the use of said one set of a plurality of engine control values, said engine control means prohibits writing of said set of a plurality of engine control values to the memory means corresponding to a cylinder in which said engine control means controls the fuel injector and the spark plug.

12. A control device according to claim 11, wherein said detecting means comprises an engine load detecting unit for detecting an engine load, and said amount of fuel to be injected during the intake stroke, which is calculated by said calculating means, is equal to 0 when said engine load detected by said engine load detecting unit is smaller than a first predetermined engine load.

13. A control device according to claim 12, wherein said first predetermined engine load represents a middle engine load.

14. A control device according to claim 11, wherein an amount of fuel to be injected corresponding to said first predetermined engine load is equal to an amount of fuel which is a sum of a first minimum amount of fuel to be injected during the compression stroke for forming an air-fuel mixture which can be ignited by the spark plug and a second minimum amount of fuel to be injected during the intake stroke for forming an air-fuel mixture in which a flame can be propagated even when injected fuel is uniformly diffused in the cylinder.

15. A control device according to claim 11, wherein said detecting means comprises an engine load detecting unit for detecting an engine load, and said amount of fuel to e injected during the compression stroke, which is calculated by said calculating means, is equal to 0 when said engine load detected by said engine load detecting unit is larger than a second predetermined engine load.

16. A control device according to claim 15, wherein said second predetermined engine load represents a high engine load.

17. A control device according to claim 15, wherein an amount of fuel to be injected corresponding to said second predetermined engine load is equal to a third minimum amount of fuel to be injected during the intake stroke for forming an air-fuel mixture which can be ignited by the spark plug even when the injected fuel is uniformly diffused in the cylinder.

* * * * *

UNITED STATES PATENT AND TRADEMARK OFFICE
CERTIFICATE OF CORRECTION

PATENT NO. : 5,127,378

DATED : July 7, 1992

INVENTOR(S) : Ito

It is certified that error appears in the above-identified patent and that said Letters Patent is hereby corrected as shown below:

Column 14    line 22, change "mans" to --means--.

Column 17    line 10, change "e" to --be--;

Signed and Sealed this

Twenty-fourth Day of May, 1994

Attest:

BRUCE LEHMAN

*Attesting Officer*    *Commissioner of Patents and Trademarks*